(12) United States Patent
Rivola et al.

(10) Patent No.: US 12,565,009 B2
(45) Date of Patent: Mar. 3, 2026

(54) SEALING AND CUTTING DEVICE FOR FORMING FILTER-BAGS WITH INFUSION PRODUCTS

(71) Applicant: I.M.A. INDUSTRIA MACCHINE AUTOMATICHE S.p.A., Ozzano Dell'Emilia (IT)

(72) Inventors: Sauro Rivola, Ozzano Dell'Emilia (IT); Simone Badini, Ozzano Dell'Emilia (IT); Dylan Forni, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 1090 days.

(21) Appl. No.: 17/619,734

(22) PCT Filed: Jun. 23, 2020

(86) PCT No.: PCT/IB2020/055894
§ 371 (c)(1),
(2) Date: Dec. 16, 2021

(87) PCT Pub. No.: WO2021/001723
PCT Pub. Date: Jan. 7, 2021

(65) Prior Publication Data
US 2025/0269609 A1 Aug. 28, 2025

(30) Foreign Application Priority Data
Jul. 1, 2019 (IT) ........................ 102019000010533

(51) Int. Cl.
*B29C 65/08* (2006.01)
*B29C 51/30* (2006.01)
(Continued)

(52) U.S. Cl.
CPC .......... *B29C 65/08* (2013.01); *B29C 65/7451* (2013.01); *B65B 51/225* (2013.01); *B65B 51/30* (2013.01)

(58) Field of Classification Search
CPC . B29C 65/08; B29C 65/7451; B29C 66/0062; B29C 65/7455; B29C 66/1122;
(Continued)

(56) References Cited

U.S. PATENT DOCUMENTS 6,076,337 A * 6/2000 Sunter ................. B29C 66/4312
156/304.6
2003/0217530 A1 11/2003 Tillack et al.
(Continued)

FOREIGN PATENT DOCUMENTS

| CN | 201872981 U | 6/2011 |
| DE | 102009045299 A1 | 4/2011 |
| DE | 102014101802 A1 | 8/2015 |

OTHER PUBLICATIONS

Indian Office Action dated May 29, 2023 from counterpart Indian Patent Application No. 202127055156.
(Continued)

*Primary Examiner* — George R Koch
*Assistant Examiner* — Christopher C Caillouet
(74) *Attorney, Agent, or Firm* — SHUTTLEWORTH & INGERSOLL, PLC; Timothy J. Klima

(57) ABSTRACT

A sealing and cutting device for forming bags containing products includes; a sonotrode for sealing a portion of a continuous tubular strip, feeding along a feed direction; a counterhead positioned facing the sonotrode; a movement system for moving the sonotrode and/or anvil between a first non-operating position, wherein the sonotrode and the anvil are apart, and a second operating position wherein the sonotrode and the anvil are in contact to simultaneously seal
(Continued)

a head and bottom of respective bags. A cutting element includes a circular blade connected to a supporting and movement element which imparts a translational movement to the blade with a circular shape along a direction perpendicular to the feed direction of the strip. The anvil includes a slit from which the blade protrudes, for cutting the strip, by contact with the sonotrode in the second operating position, to separate a bag formed from the remaining strip.

13 Claims, 5 Drawing Sheets

(51) Int. Cl.
B29C 65/74 (2006.01)
B65B 51/22 (2006.01)
B65B 51/30 (2006.01)

(58) Field of Classification Search
CPC .............. B29C 66/4312; B29C 66/729; B29C 66/7294; B29C 66/81431; B29C 66/83221; B29C 66/849; B29C 66/8511; B65B 51/225; B65B 51/30; B65B 29/028; B65B 51/303; B65B 61/06; B29L 2031/7122; B01D 29/111; B01D 29/117; B26D 1/151; B32B 38/0004

See application file for complete search history.

(56) References Cited

U.S. PATENT DOCUMENTS

| 2004/0094254 | A1 | | 5/2004 | Lim | |
|---|---|---|---|---|---|
| 2018/0265231 | A1 | * | 9/2018 | Caudle | ...................... B65B 3/16 |
| 2020/0172278 | A1 | * | 6/2020 | Gentili | ............. B29C 66/81433 |
| 2020/0353698 | A1 | * | 11/2020 | Shimoda | ............. B29C 65/7894 |

OTHER PUBLICATIONS

International Search Report and Written Opinion dated Dec. 22, 2020 from International Patent Application No. PCT/IB2020/055894.

Chinese Office Action dated Oct. 10, 2022 from counterpart Chinese Patent Application No. 202080048721.3.

* cited by examiner

SEALING AND CUTTING DEVICE FOR FORMING FILTER-BAGS WITH INFUSION PRODUCTS

This application is the National Phase of International Application PCT/IB2020/055894 filed Jun. 23, 2020 which designated the U.S.

This application claims priority to Italian Patent Application No. 102019000010533 filed Jul. 1, 2019, which application is incorporated by reference herein.

TECHNICAL FIELD

This invention relates to a sealing and cutting device for forming filter bags for infusion products, such as, for example, tea, coffee, chamomile and the like.

BACKGROUND ART

The filter bags according to the invention may be of the so-called traditional type, that is to say, single-lobed or double-lobed filter bags (that is, with a flat extension) or also the pyramidal filter bags (that is, with a substantially three-dimensional extension).

Both types of filter bags have as common elements, as well as a piece of filter material paper and a dose of infusion product, a stretch of thread which is joined, on one side, to the piece of filter material and, on the other side, to a gripping tag.

The thread is usually positioned around the filter bag according to a predetermined path and associated with the filter bag with joining points (for example by sealing) of a differentiated type: strong points if the join must be maintained even during use or light points if that part of the thread has to be detached before use.

The machines for forming this type of filter bag may comprise in a prior art solution of the example type and as the base structure:

a wheel defining one or more work surfaces and rotating about its own axis in such a way as to define a working path having a circular feed direction;

a first feed station for depositing individual tags, in phase, on the cylindrical work surface in a predetermined zone of the working path;

a second feed station for feeding, along a weave path, a continuous thread on the cylindrical work surface, starting from a predetermined zone downstream of the zone for depositing the individual tags with reference to the feed direction; the above-mentioned weave path of the thread is also obtained thanks to the presence of protruding pins present on the cylindrical work surface;

a third feed station for feeding a continuous strip of filter material along the cylindrical work surface superposing the weave of thread and the tag and deposited downstream relative to the second feed station;

a first group of sonotrodes, interposed between the second and the third feed station, configured for making a first series of seals between the thread and the tag (in particular programmed to obtain strong type seals);

a second group of sonotrodes, positioned downstream of the first group of sonotrodes and at the cylindrical work surface in which the strip of filtering material is deposited; the second group of sonotrodes is configured to form both a plurality of seals between the stretch of thread, arranged according to the weave path and present under the strip of filter material, and the strip, and between the strip and the tag (in this case the second group of sonotrodes is configured to obtain light type seals);

a station for completion of the filter bag already provided with the tag and the thread, positioned downstream of the wheel, and configured for forming geometrically the filter bag (flat, pyramidal or tetrahedral shape), for introducing a dose of infusion product and closing the filter bag in its shape with an ultrasound device and separate the individual filter bags formed.

As already mentioned, in the current machines for forming the above-mentioned filter bags stations are used for forming the above-mentioned joining points and stations for sealing and cutting the filter bag formed with ultrasound devices.

In particular, the ultrasonic device used for sealing and cutting the filter bags formed is positioned downstream of the line for forming the filter bags and allows the simultaneous closing of the top of a filter bag formed and the bottom of a filter bag being positioned upstream of the previous filter bag relative to a feed direction of the strip of filter material.

The sealing and cutting device comprises:

a sonotrode for sealing the strip of filter material;

a counter-plate or anvil positioned facing the sonotrode;

a movement system connected to the sonotrode and to the anvil and configured for moving the sonotrode and the anvil between a first non-operating position, wherein sonotrode and anvil are spaced apart, and a second operating position wherein the sonotrode and anvil are in front contact for sealing the strip of filter material; the sonotrode and the anvil are moved transversely relative to the feed direction of the strip;

a cutting element or knife positioned on the anvil and able to separate the strip of filter material after sealing the strip; the cutting element is moved by means of movement means, synchronised with the movement of the sonotrode and the anvil, between a withdrawn non-operating position, wherein the cutting element is housed in the anvil, and an advanced operating position for cutting the strip of filter material, wherein the cutting element protrudes from the anvil and separates the strip of filter material.

In this solution, the sonotrode has a C-shaped cross-section to define, on one side, the sealing of the top of a filter bag already provided with the dose of product and, on the other hand, the bottom of a next filter bag to be formed.

The groove present in the centre of the sonotrode allows the insertion of the knife during the step of cutting the strip of filter material, that is, the two filter bags being formed, with a scissor-like action.

However, this technical solution has some drawbacks.

The combination between a linear knife and the groove of the sonotrode to perform a sort of scissor cut causes rapid wear of the cutting part of the knife.

The wear of the knife also increases further due to the high elasticity of some materials used in the formation of filter bags, in particular the so-called "woven-non-oven" materials.

To this must be added the fact that, in order to obtain a precise and good quality cut with this solution, it is necessary to deactivate the sonotrode during the cutting step to prevent the vibrations from determining an incorrect cutting line. This requires an overall slowing down of the steps and a greater stress of the components of the sonotrode.

DISCLOSURE OF THE INVENTION

The aim of this invention is to provide a sealing and cutting device for forming filter bags with infusion products, such as, for example, tea, coffee, camomile and the like, which overcomes the above-mentioned drawbacks.

In particular, the aim of the invention is to provide a sealing and cutting device for forming filter bags with infusion products, such as, for example, tea, coffee, camomile and the like, which is able to improve the final quality of the filter bags.

A further aim of the invention is to provide a sealing and cutting device for forming filter bags with infusion products, such as, for example, tea, coffee, camomile and the like, which is able to increase the operating life of the components forming the device and, at the same time, reduce the times for forming the filter bags.

Said aims are fully achieved by the sealing and cutting device for forming filter bags with infusion products, such as, for example, tea, coffee, chamomile and the like, according to this invention as characterised in the appended claims.

BRIEF DESCRIPTION OF DRAWINGS

The technical features of the invention will become more apparent from the following detailed description of a preferred, non-limiting embodiment of it, illustrated by way of example in the accompanying drawings, in which.

DETAILED DESCRIPTION OF PREFERRED EMBODIMENTS OF THE INVENTION

Figure 1:
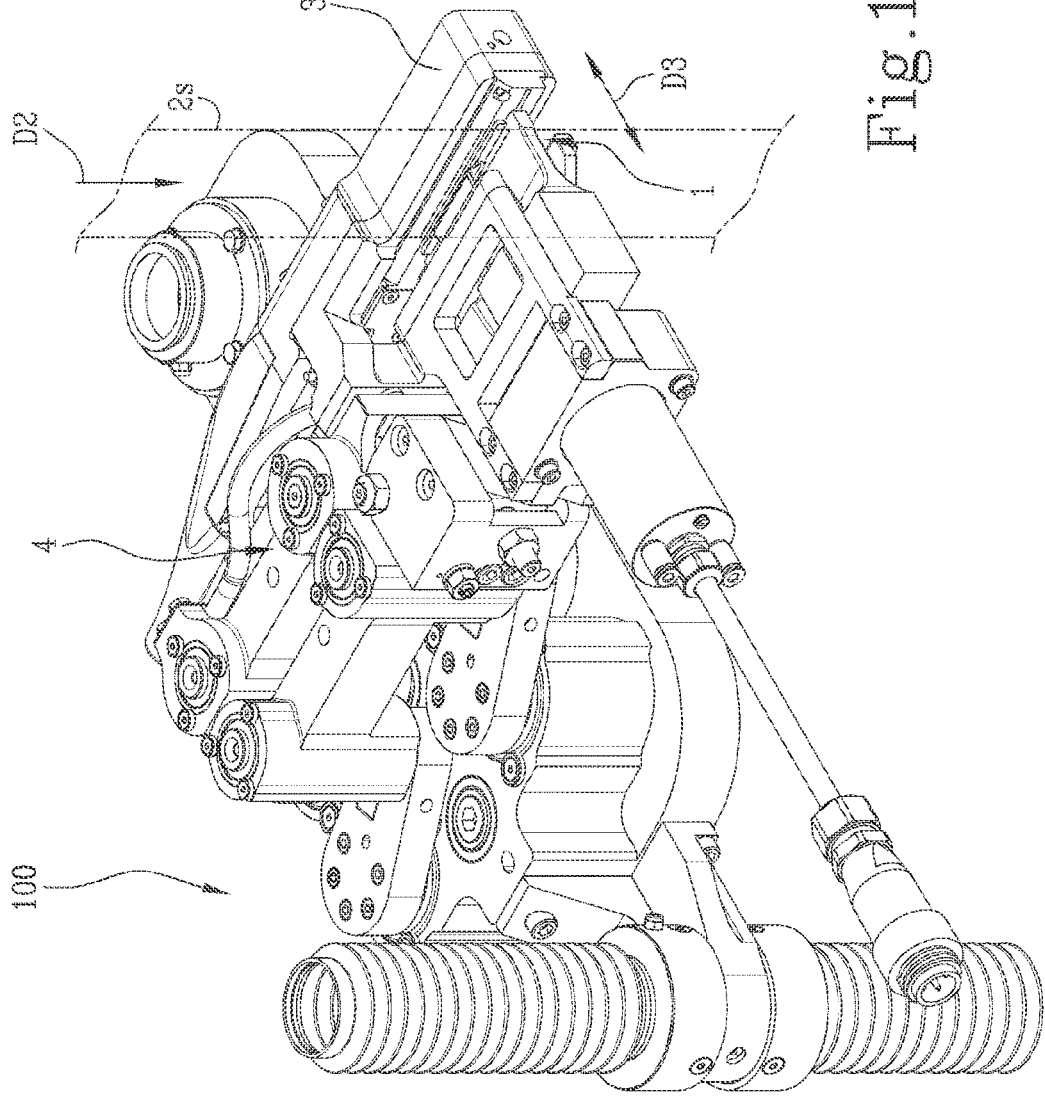
FIG. 1 is a schematic front view, with some parts cut away to better illustrate others, of a device for sealing and cutting for forming filter bags for infusion products according to this invention.
Figure 2:
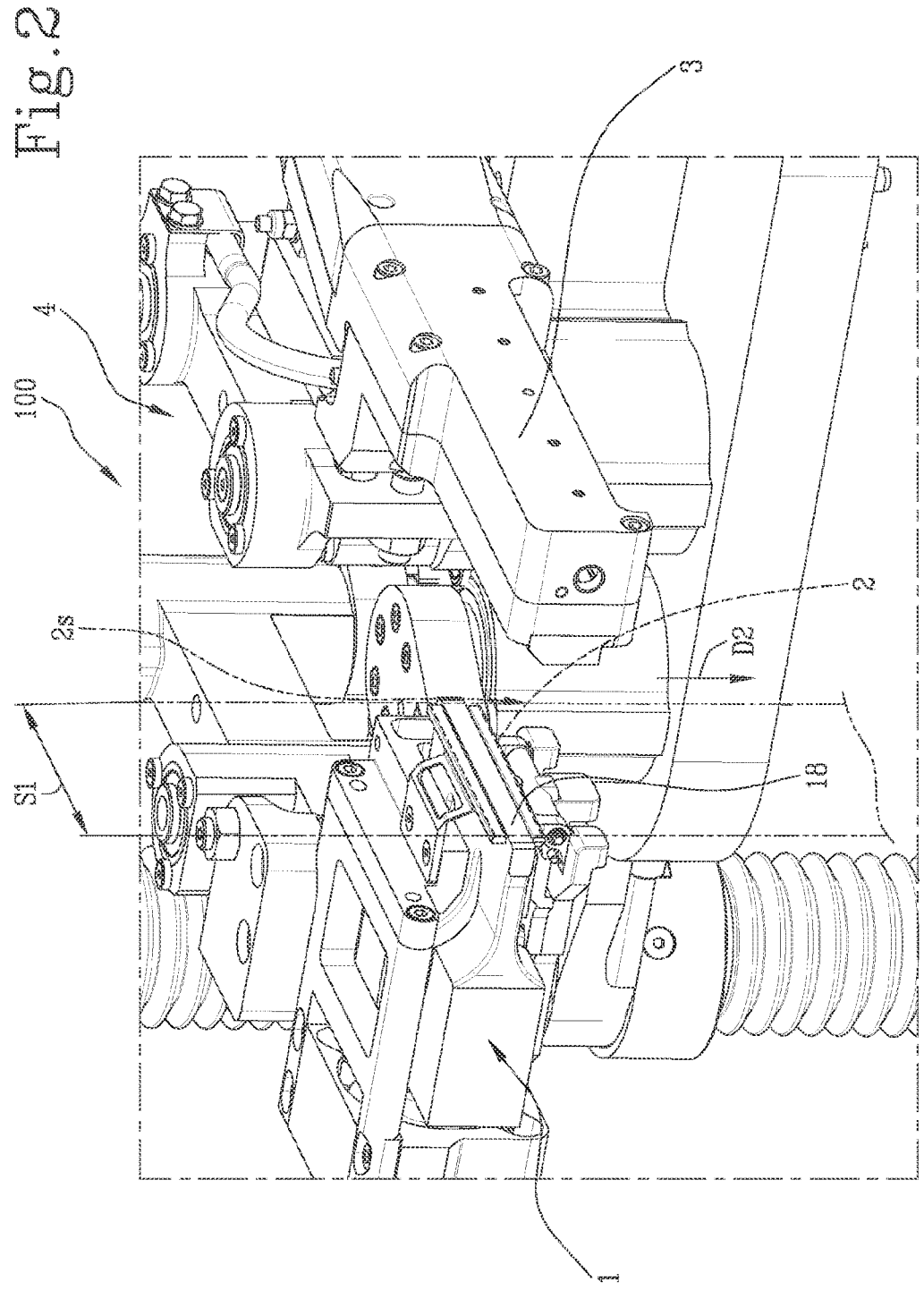
FIG. 2 is a perspective view of a scaled-up detail of a sonotrode and an anvil forming part of the sealing and cutting device of FIG. 1.
Figure 3:
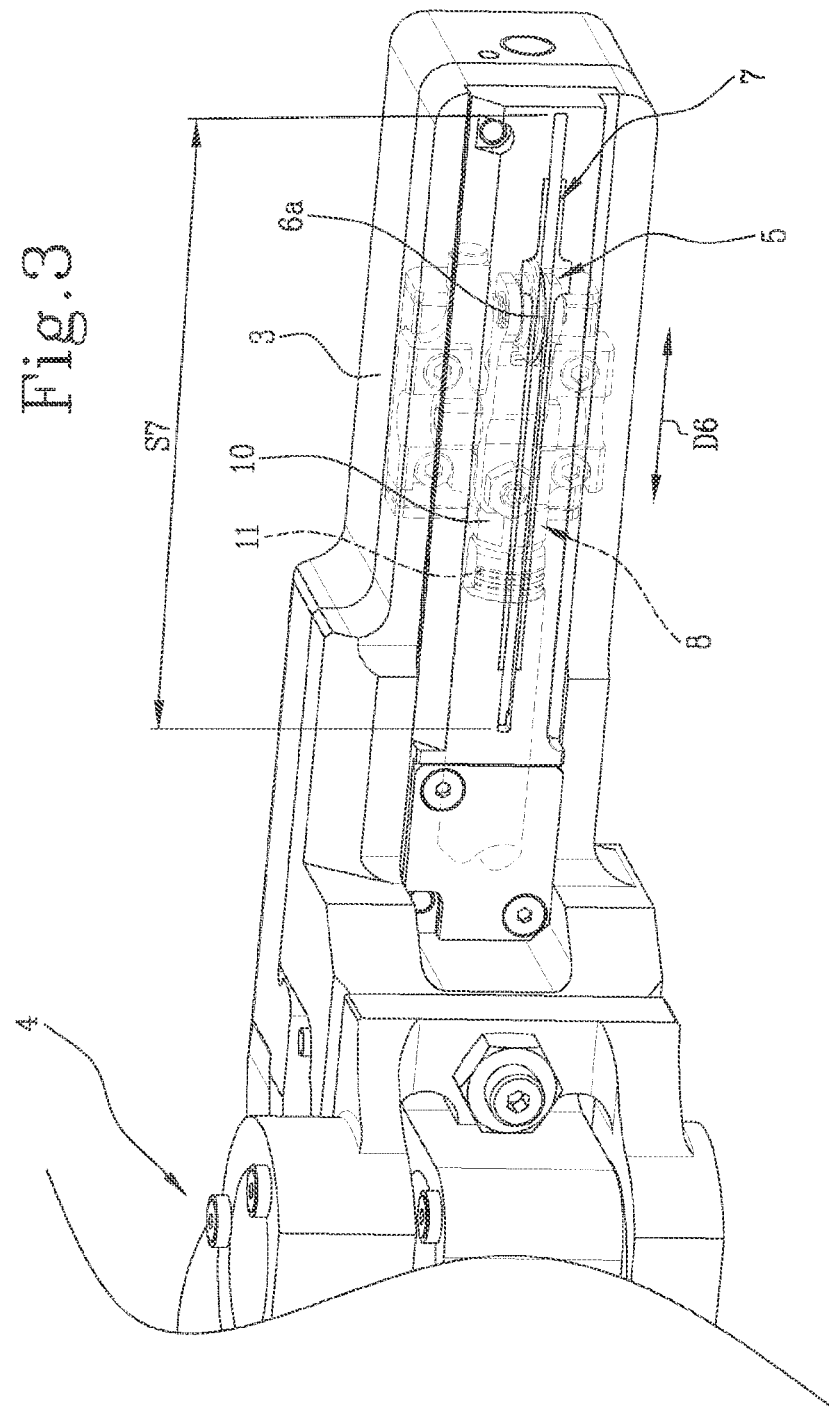
FIG. 3 is a front perspective view of the anvil of the cutting device.
Figures 4, 5:
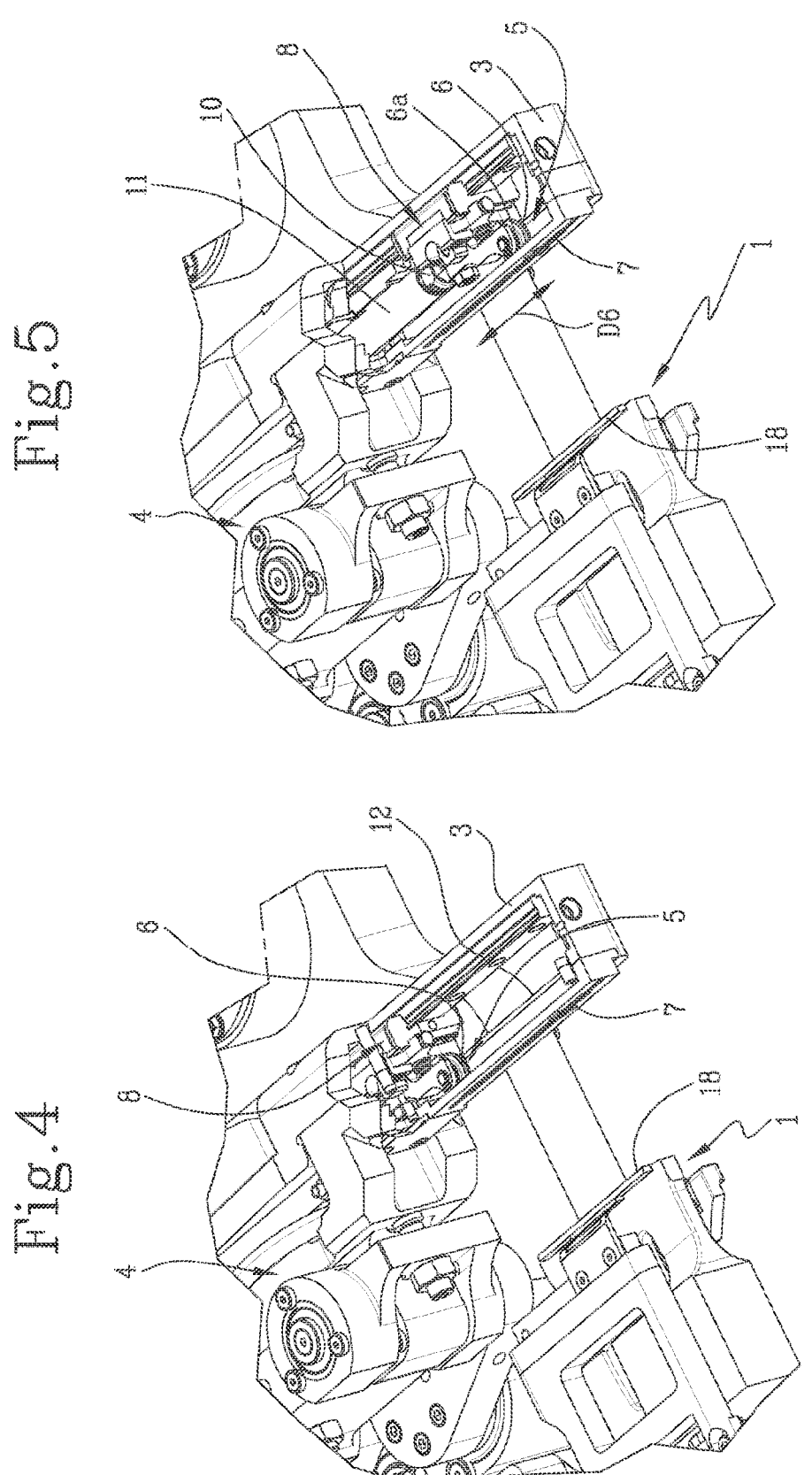
FIGS. 4 and 5 are perspective views, with some parts cut away to better illustrate others, of the sonotrode and anvil unit in a non-operating position and with a cutting element positioned on the anvil in two different operating positions.

With reference to the accompanying drawings, and in particular to FIGS. 1 and 2, the device according to the invention, labelled 100 in its entirety, is used for sealing (by ultrasound) and cutting so as to form bags containing products of different types.

In the case illustrated, purely by way of a non-limiting example, the formation of filter bags for infusion products is described.

Therefore, again by way of example, the sealing and cutting device 100 may be used on machines (not illustrated) for forming filter bags configured to form both the three-dimensional filter bags such as the pyramid bags and the so-called traditional single-lobed or double-lobed bags with a rectangular shape.

Each bag is obtained with a piece of material containing at least one dose of product. In the case of filter bags, each filter bag is obtained with a piece of filter material containing a dose of infusion product.

Described below is the bag to be joined and cut from by device according to the invention, such as a filter bag obtained with filter material, but the solution according to the invention may be applied any other type of bag containing a product without limiting the scope of the solution.

The sealing and cutting device 100 comprises a sealing head 1 or sonotrode configured for sealing a portion 2 of a continuous tubular strip 2s of filter material (illustrated with a dashed line in FIGS. 1 and 2), feeding along a feed direction D2 (in such a way as to define a closed head of a first filter bag already provided with a dose of product and the bottom of a second filter bag being formed upstream of the first relative to the feed direction D2).

The direction of feed of the strip 2s may be along a vertical plane, a horizontal plane or an inclined plane depending on the type of forming machine on which the device 100 is applied.

The sealing and cutting device 100 comprises a counter-head or anvil 3 positioned facing the sonotrode 1.

The anvil 3 has a box-shaped structure with a length (or main longitudinal extension) at least equal to or greater than the length of the sonotrode 1.

The sealing and cutting device 100 comprises a movement system 4 connected to the sonotrode 1 and/or to the anvil 3 and configured for moving the sonotrode 1 and the anvil 3 (in a synchronised fashion) between a first non-operating position, wherein the sonotrode 1 and the anvil 3 are spaced apart, and a second operating position wherein the sonotrode 1 and the anvil 3 are in front contact for sealing the portion 2 of the strip of filter material, in such a way as to form a simultaneous sealing of a top and bottom of respective bags to be formed.

The sonotrode 1 and the anvil 3 are moved in a synchronised fashion along a direction D3 of movement transversal to the feed direction D2 of the continuous strip 2s of filter material.

The movement system 4 (connected to the sonotrode 1) comprises a plurality of kinematic mechanisms (such as pairs of connecting rods and cranks and relative drive units) which are able to synchronise the movement towards and away from the sonotrode 1 and the anvil 3.

The sealing and cutting device 100 comprises a cutting element 5 comprising a circular blade 6 connected to a supporting and movement element 8 which is able to impart a translational movement to the blade 6 with a circular shape along a direction D6 perpendicular to the feed direction D2 of the continuous tubular strip 2s.

It should be noted that the cutting element 5 is positioned on the anvil 3 and configured to cut the strip 2s of filter material, with the sonotrode 1 and the anvil 3 in the second operating position, in such a way as to separate the first filter bag formed from the remaining continuous strip 2s of filter material.

As illustrated also in FIGS. 3 to 7, the anvil 3 comprises a slit 7 from which the blade 6 protrudes, which is configured for cutting the tubular strip 2s, by contact with the sonotrode 1, whilst the sonotrode 1 and the anvil 3 are in the second operating position, in such a way as to separate a bag formed from the remaining continuous strip 2s.

According to a first embodiment, the cutting element 5 comprises a wheel 6a with a circular blade profile 6 articulated, and freely rotatable, with the movement and support unit 8 positioned inside the anvil 3.

According to a second embedment, the cutting element 5 comprises a wheel 6a with a circular blade profile 6 associated rigidly with the movement and support unit 8 positioned inside the anvil 3.

According to a third embodiment, the cutting element 5 comprises a wheel 6a with a circular blade profile 6 articulated with the movement and support unit 8 positioned inside the anvil 3.

In light of this, the wheel 6a is connected to an independent movement unit 9 configured to impart the forced rotation to the wheel 6a, at least during the translation movement of the blade 6 (irrespective of the contrast with the sonotrode 1).

Figures 6, 7:
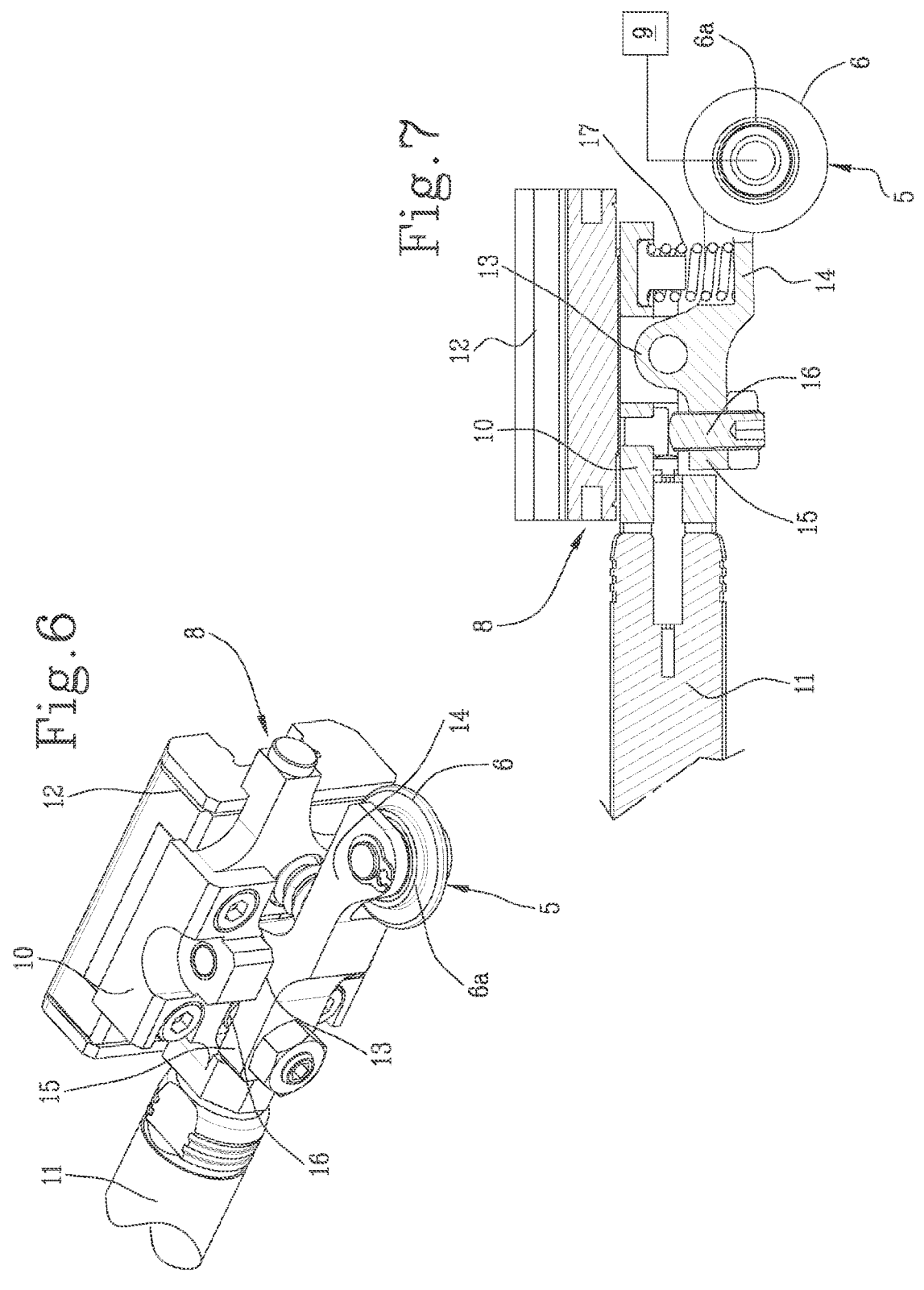
FIG. 6 is a perspective view of the movement unit of the cutting element of the previous drawings.
FIG. 7 is a cross section of the movement unit of the cutting element of FIG. 6.

The independent unit 9 is illustrated with a block in FIG. 7 and may consist of a drive unit or a kinematic coupling with a pinion-rack unit which is able to rotate the wheel 6 when the movement and support means 8 are activated.

Preferably, the movement and support unit 8 comprises a body 10 for supporting the wheel 6a connected to an actuator 11 configured for moving, in both directions, the supporting body 10 along the longitudinal extension of the anvil 3.

In light of this, the supporting body 10 is slidably connected to a linear guide 12 positioned inside the anvil 3 in such a way as to allow a rectilinear stroke of translation in both directions of the wheel 6a.

Preferably, the supporting body 10 comprises a rocker 13 articulated in its central part to the supporting body 10.

The rocker 13 has a first arm 14 and a second arm 15.

The wheel 6a is articulated on the first arm 14 (on the free end of the first arm 14). A grub screw 16 for adjusting and counter-balancing in contact with the supporting body 10 is screwably connected on the second arm 15 in such a way as to adjust the operating position of the wheel 6a protruding from the slit 7.

In light of this, an elastic preloading element 17 (a spring) is interposed between the supporting element 8 (the supporting body 10) and the blade 6 (the first arm 14) and is able to keep the blade 6 in contact with the sonotrode 1 in the second operating position.

As illustrated, the sonotrode 1 comprises a contact surface 18, facing the anvil 3 with a flat and continuous profile on which the blade 6 with a circular profile can slide in such a way as to determine a cut of the tubular strip 2s of filter material by making contact with the contact surface 18.

Preferably, the anvil 3 has the slit 7 with a length S7 at least equal to the length S1 of the sonotrode 1 in the sealing zone (preferably, the slit 7 may have an extension greater than the extension of the sonotrode 1).

Preferably, the anvil 3 is made as a single piece.

Preferably, the sonotrode 1 and/or the blade 6 are made of hardened materials. The invention also provides a method for sealing and cutting bags (filter) containing infusion products.

The method comprises the following steps:

preparing a sealing head 1 or sonotrode configured for sealing a portion 2 of a continuous tubular strip 2s of filter material, feeding along a feed direction D2;

preparing a counterhead or anvil 3 positioned facing the sonotrode 1;

moving the sonotrode (1) and anvil (3) towards each other along a direction (D3) of movement transversal to the direction (D2) of feeding the continuous tubular strip (2s) of filter material, until contact with the tubular strip (2s) of filter material;

joining the portion 2 of the tubular strip 2s of filter material, by activating the sonotrode 1, in such a way as to achieve a simultaneous sealing of a head and of a bottom of respective bags to be formed (as in the case illustrated, a closed head of a first filter bag already provided with a dose of product and the bottom of a second filter bag being formed positioned upstream of the first relative to the feed direction D2);

cutting along the portion 2 of continuous tubular strip 2s of sealed filter material, using a cutting element 5, in such a way as to separate a filter bag formed from the remaining continuous tubular strip 2s of filter material; this cutting step comprises a translation of the cutting element 5 with the blade 6 in a circular shape along a direction D6 perpendicular to the feed direction D2 of the continuous tubular strip 2s.

As illustrated, the cutting step is performed by the blade 6 by contact on the sonotrode 1.

It should also be noted that the cutting step comprises a translation of the cutting element 5 with the blade 6 having a circular shape along a direction D6 perpendicular to the direction D3 of movement of the sonotrode 1 and the anvil 3.

It should be noted that the translation of the cutting element 5 occurs along the entire longitudinal extension of the sonotrode 1 and the anvil 3 to allow a secure and complete separation of the filter bag formed relative to the remaining strip of filter material.

Preferably, during the cutting step by the cutting element 5 with the blade 6 with a circular shape occurs during the sealing step of the activated sonotrode 1.

The preset aims with numerous advantages are achieved thanks to a machine structured in this way.

The presence of a circular blade (preferably rotating) makes it possible to increase the working life of the blade.

The presence of a flat sonotrode which defines a surface for contact with the circular blade increases the safety and precision of cutting the stretch of strip of filter material.

The presence of a circular blade which is movable along a linear trajectory along the extension of the sonotrode and anvil makes it possible to cut with the sonotrode switched on in such a way as to improve the times and allow a clean and precise cutting of the stretch of filter material without fraying the edges of the cut stretches.

The invention claimed is:

1. A device for sealing and cutting a continuous tubular strip to form bags containing a product, the device comprising:

a sonotrode configured to seal a portion of the continuous tubular strip advancing along a feed direction;

an anvil positioned opposite the sonotrode;

a movement system operatively coupled to at least one of the sonotrode or to the anvil, the movement system being configured to move the sonotrode and the anvil between a non-operating position, in which the sonotrode and the anvil are spaced apart, and an operating position in which the sonotrode and the anvil are in contact with one another to seal the tubular strip such that a head and a bottom of adjacent bags are simultaneously sealed;

a cutting element including a circular blade operatively coupled to a support and movement unit, the support and movement unit being configured to translate the blade along a direction perpendicular to the feed direction of the tubular strip, the anvil including a slit through which the blade protrudes, wherein the blade is configured to cut the tubular strip by contacting the sonotrode while the sonotrode and the anvil are in the operating position, thereby separating a sealed bag from a remainder of the tubular strip.

2. The device according to claim 1, wherein the cutting element comprises a wheel having a circular blade profile, the wheel being articulated, and freely rotatable with respect to the support and movement unit, the support and movement unit being positioned within the anvil.

3. The device according to claim 2, wherein the support and movement unit comprises a support body coupled to an actuator configured to move the support body in both directions along a longitudinal extension of the anvil; and wherein the support body is slidably coupled to a linear guide positioned within the anvil to enable a rectilinear translation of the wheel in both directions.

4. The device according to claim 2, wherein the support body includes a rocker pivotally mounted to the support body, the rocker having a first arm and a second arm, the wheel being mounted on the first arm, and an adjusting screw being threaded into the second arm in contact with the support body, such that a position of the wheel protruding from the slit in the anvil is adjustable.

5. The device according to claim 1, wherein the cutting element comprises a wheel having a circular blade profile, the wheel being rigidly connected to the support and movement unit, the support and movement unit being positioned within the anvil.

6. The device according to claim 1, wherein the cutting element comprises a wheel having a circular blade profile, the wheel being articulated with respect to the support and movement unit positioned within the anvil; and wherein the wheel is operatively connected to an independent movement unit configured to impart forced rotation of the wheel, at least during translational movement of the blade.

7. The device according to claim 1, further comprising an elastic element interposed between the support and movement unit and the blade to maintain contact between the blade and the sonotrode when the device is in the operating position.

8. The device according to claim 1, wherein the sonotrode comprises a contact surface facing the anvil, the contact surface having a flat and continuous profile configured to permit the circular blade to slide therein, thereby facilitating cutting of the tubular strip by contact with the contact surface.

9. The device according to claim 1, wherein the slit in the anvil has a length at least equal to a length of the sonotrode in a sealing zone.

10. The device according to claim 1, wherein the anvil is formed as a single integral piece.

11. The device according to claim 1, wherein at least one of the sonotrode or the blade is made of a hardened material.

12. A method for sealing and cutting bags containing a product, the method comprising:

providing a device for sealing and cutting a continuous tubular strip to form bags containing a product, the device comprising:

a sonotrode configured to seal a portion of the continuous tubular strip advancing along a feed direction:

an anvil positioned opposite the sonotrode;

a movement system operatively coupled to at least one of the sonotrode or the anvil, the movement system being configured to move the sonotrode and the anvil between a non-operating position, in which the sonotrode and the anvil are spaced apart, and an operating position in which the sonotrode and the anvil are in contact with one another to seal the tubular strip such that a head and a bottom of adjacent bags are simultaneously sealed;

a cutting element including a circular blade operatively coupled to a support and movement unit, the support and movement unit being configured to translate the blade along a direction perpendicular to the feed direction of the tubular strip, the anvil including a slit through which the blade protrudes, wherein the blade is configured to cut the tubular strip by contacting the sonotrode while the sonotrode and the anvil are in the operating position, thereby separating a sealed bag from a remainder of the tubular strip;

feeding the continuous tubular strip along the feed direction;

positioning the sonotrode and the anvil opposite one another, with the sonotrode configured to seal the portion of the tubular strip;

moving the sonotrode and anvil towards each other along a direction transverse to the feed direction until the sonotrode and anvil contact the tubular strip;

sealing the portion of the tubular strip by activating the sonotrode such that the head and the bottom of the adjacent bags are simultaneously sealed;

cutting the sealed portion of the tubular strip using the cutting element including the circular blade, the cutting element translating the blade along the direction perpendicular to the feed direction, wherein the cutting is performed by the blade making contact with the sonotrode, thereby separating the sealed bag from the remainder of the tubular strip, and wherein the cutting step is performed simultaneously with the sealing step while the sonotrode is activated.

13. The method according to claim 12, wherein the continuous tubular strip is made of filter material and the product is an infusion product.

* * * * *